United States Patent Office 2,761,812
Patented Sept. 4, 1956

2,761,812

PRODUCTION OF PENICILLIN

Donald John Darlington Hockenhull and George Desmond Wilkin, Uxbridge, and Anthony Richard John Quilter, South Chingford, London, England, assignors to Glaxo Laboratories Limited, Greenford, England, a British company No Drawing. Application March 6, 1953,
Serial No. 340,916

Claims priority, application Great Britain March 10, 1952

11 Claims. (Cl. 195—36)

This invention is concerned with improvements in or relating to the production of penicillin and is more particularly concerned with improved media for the fermentation of penicillin producing moulds. By the term "penicillin" we mean one or a mixture of more than one of the antibiotic substances produced by the fermentation of moulds of the genus Penicillium for example, *Penicillium notatum* and *Penicillium chrysogenum*: examples of the antibiotics which come within the general term penicillin are those known as penicillin G, penicillin X, and penicillin F, of which penicillin G is the most important. The penicillins may be represented by the general formula

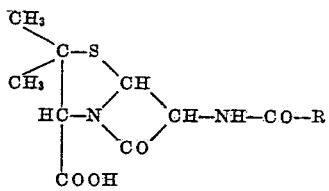

where R can represent various groups; in the case of penicillin G, R is a benzyl group.

Penicillin is produced by the fermentation of a penicillin producing mould in a suitable nutrient medium, normally under aerobic deep culture conditions and very extensive research has been carried out to discover suitable nutrient media which give rise to maximum yields of penicillin. The media at present used for the commercial production of penicillin are based on corn steep liquor and contain besides this material, water, nutrient salts, a carbohydrate such as lactose and if desired other organic material such as maize oil. The composition of media based on corn steep liquor required to support the growth of a penicillin producing mould are well known and such a medium is herein referred to as "a corn steep liquor medium."

It is also well-known that the yields of penicillin obtained by fermenting a penicillin-producing mould in a suitable corn steep liquor medium can be markedly increased by including in such media certain organic substances such as phenylacetic acid, phenylacetamide, β-phenylethylamine (see British Patent No. 586,930) and such substances have become known as penicillin precursors. Such substances are believed to supply the fragment R in the above mentioned formula for penicillin since the nature of the precursors effects the nature of the penicillin obtained; thus if the medium contains phenylacetic acid improved yields of benzyl penicillin (penicillin G) are obtained, while if p-hydroxyphenylacetic acid is employed a greater proportion of p-hydroxybenzyl penicillin results. Other precursors of the general formula

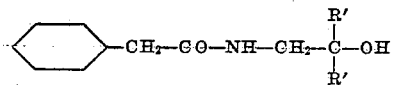

(where R′ is a member of the group of radicles consisting of hydrogen, methyl, ethyl, lower alkyl ethers and acyloxy derivatives thereof) are referred to in specification No. 613,492 for example phenylacetylethanolamine. A substance containing in its molecule the fragment R of the penicillins and which when included in a suitable corn steep liquor medium gives rise to increased yields of penicillin is herein referred to as a "penicillin precursor."

United States Patent No. 2,437,918 describes the incorporation of substances there referred to as "sulphite containing compounds" in penicillin fermentation media, and while referring in general terms to many sulphur containing compounds, deals in specific terms with metallic sulphites; the specification refers in one instance to the use of thiosulphates but no examples are given of the employment of thiosulphates in a corn steep liquor medium nor of the results to be obtained thereby; the addition of such sulphite containing compounds is suggested more for so-called synthetic media than for corn steep liquor media, and indeed it is suggested that the presence of the sulphite enables corn steep liquor to be dispensed with. To the best of our knowledge the use of sulphites has not found favour with penicillin manufacturers in the United Kingdom or in the United States of America.

As a result of considerable experiment we have now made the discovery that for optimum penicillin production using a suitable corn steep liquid medium it is necessary to provide in the medium both a source of the fragment R of the penicillin molecule and a source of sulphur (presumably for the thiazolidene ring). Thus our observations show that the addition of a penicillin precursor by itself while giving rise to increased yields of penicillin, will give further increases of yield if a suitable source of sulphur is present. Similarly while the presence of a source of sulphur by itself in a medium which does not contain a penicillin precursor is helpful, the presence of a precursor still further increases the yield. These discoveries are important at high levels of added substance. Thus for example prior to the present invention optimal yields were obtained with additions of phenylacetylethanolamine of the order of 0.1% and increased quantities over this figure did not give much extra penicillin; we now find that by also including a source of sulphur we are able to use higher levels of penicillin precursors and obtain higher yields of penicillin than can be obtained using any quantity of precursor without such addition; thus in effect by having both the source of sulphur and the penicillin precursor present together in the medium it appears that the mould is able to make more use of each of these two individual substances than would be the case if only one of them were present. The selection of a suitable source of sulphur for the purpose of the present process has required careful research and several sources such as those proposed in United States Patent 2,437,918 have been tested. We find however that thiosulphates alone appear to give satisfactory results and that other sulphur-containing compounds, such as cysteine, sulphates, sulphites and the like are not satisfactory. Our invention is further only of value under conditions of culture in which high yields are normally obtainable namely deep culture conditions. In brief it may be said that the discovery on which the present invention is based is that by fermenting under deep culture conditions a penicillin producing mould in a suitable corn-steep liquor medium containing both a thiosulphate and a penicillin precursor, the mould is more able to take advantage of the precursor and the sulphur in its synthesis of penicillin with the result that higher levels of these two additives can be used with the resulting production of higher yields of penicillin than has hitherto been possible. Under optimum conditions yields of greater than 2,000 international units per ml. may be consistently obtained. It is to be noted that our experiments show that the high yields obtainable by the process according to the invention cannot in general be achieved with synthetic media which contain a source of sulphur and a penicillin precursor but which contain no corn steep liquor.

According to the present invention therefore we provide a process for the production of penicillin in which a penicillin producing mould is fermented under deep culture conditions in a corn steep liquor medium containing a thiosulphate and a penicillin precursor as herein defined.

According to a further feature of the invention the penicillin precursor is phenylacetic acid, phenylacetamide, phenylacetylethanolamine, or β-phenylethylamine.

The thiosulphate employed should be at least partially soluble in water and its cationic portion should cause no poisoning of the mould nor destruction of the penicillin produced at the level at which it is employed. It will be easy to determine by preliminary "shake-flask" experiments whether any particular thiosulphate is suitable; we prefer to employ sodium thiosulphate, potassium thiosulphate, ammonium thiosulphate or magnesium thiosulphate.

The preferred penicillin producing moulds for the purpose of the present invention are Penicillium notatum and Penicillium chrysogenum.

As stated above we are able to use levels of penicillin precursor higher than those previously employed and we prefer to employ more than 0.1% and preferably 0.2% of the precursor, the upper limit being determined by the slight toxic effect on the mould of certain precursors. It is to be noted that some precursors are rapidly consumed during fermentation without necessarily being employed by the mould for penicillin synthesis and at present it is normal in such cases to add further quantities of precursor as the fermentation proceeds; such a precursor is for example phenylacetic acid.

The addition of further quantities of precursor from time to time during fermentation may also be necessary in the process according to the present invention although it is not necessary using the type of precursor referred to in British Patent No. 613,492.

We prefer to employ levels of thiosulphate in the medium corresponding to a sulphur content of greater than 0.01% and preferably approximately 0.02% of sulphur as thiosulphate is employed.

The upper limit of precursor and thiosulphate addition is determined by the quantities of these components which the mould in question will tolerate. If too much of either or both constituents is added inhibition of growth takes place. However the amount of either constituent which a given strain of mould will tolerate can be increased by acclimatisation of the strain to the particular conditions.

For the better understanding of the invention the following experimental work is quoted for the purposes of illustration and without limiting the general statements hereinbefore contained:

EXAMPLE 1

Experiments comparing the effect of sodium thiosulphate at 0.08% level with varying levels of phenylethylamine and phenylacetamide were carried out.

For these experiments the strain of Penicillium chrysogenum used was PM3.

The basal medium was as follows:

| | |
|---|---|
| Lactose | 3.5%. |
| C. S. L. solids | 3.5% (by weight). |
| KH$_2$PO$_4$ | 0.4%. |
| Chalk (Analar) | 1.0%. |
| Maize oil | 0.16 ml. per flask added separately. |

Sodium thiosulphate and the phenyl ethylamine or phenylacetamide as required were added by weight to portions of this bulk medium.

Assay flasks were shaken in a rotary shaker at 210 revolutions per minute. They were then assayed microbiologically to give the following results:

*0.15% phenylacetamide—5 days culture*

| Experiment No. | Titre | Mean |
|---|---|---|
| 1 | 200, 200 | 200 |
| 2 | 260, 200 | 230 |

With thiosulphate—0.08% and 0.15% phenylacetamide:

| Experiment No. | Titre | Mean |
|---|---|---|
| 3 | 610, 620 | 615 |
| 4 | 485, 480 | 480 |

0.3% phenylacetamide—No thiosulphate:

| Experiment No. | Titre | Mean |
|---|---|---|
| 5 | 300, 330 | 315 |
| 6 | 320, 325 | 325 |

With thiosulphate 0.08%:

| Experiment No. | Titre | Mean |
|---|---|---|
| 7 | 590, 540 | 565 |
| 8 | 485, 475 | 480 |

*Phenylacetamide—6 days culture*

[Level=0.15%—No thiosulphate.]

| Experiment No. | Titre | Mean |
|---|---|---|
| 9 | 285, 310 | 295 |
| 10 | 310, 320 | 315 |

With thiosulphate 0.08%:

| Experiment No. | Titre | Mean |
|---|---|---|
| 11 | 485 | 485 |
| 12 | 555, 540 | 545 |

[Level=0.3%—No thiosulphate.]

| Experiment No. | Titre | Mean |
|---|---|---|
| 13 | 555, 325 | 355 |
| 14 | 240 | 280 |

With thiosulphate 0.08%:

| Experiment No. | Titre | Mean |
|---|---|---|
| 15 | 610, 605 | 610 |
| 16 | 525 | 565 |

*Phenylacetamide—7 days culture*

[Level 0.15%.]

| Experiment No. | Titre | Mean |
|---|---|---|
| 17 | 210, 330 | 270 |
| 18 | 340, 310 | 325 |

With thiosulphate 0.08%:

| Experiment No. | Titre | Mean |
|---|---|---|
| 19 | 550, 490 | 520 |
| 20 | 440, 420 | 430 |

[Level 0.3%.]

| Experiment No. | Titre | Mean |
|---|---|---|
| 21 | 210, 365 | 285 |
| 22 | 300, 290 | 295 |

With 0.08% thiosulphate:

| Experiment No. | Titre | Mean |
|---|---|---|
| 23 | 600, 530 | 600 |
| 24 | 600 | 565 |

Phenylethylamine gave results as follows:

*5 days culture—level 0.15%*

| Experiment No. | Titre | Mean |
|---|---|---|
| 25 | 315, 335 | 325 |
| 26 | 350 | 350 |

With 0.08% thiosulphate:

| Experiment No. | Titre | Mean |
|---|---|---|
| 27 | 495 | 495 |
| 28 | 465 | 465 |

[Level 0.3%.]

| Experiment No. | Titre | Mean |
|---|---|---|
| 29 | 310 | 310 |
| 30 | 385 | 385 |

With 0.08% thiosulphate:

| Experiment No. | Titre | Mean |
|---|---|---|
| 31 | 370, 470 | 420 |
| 32 | 505, 490 | 495 |

[Level 0.6%.]

| Experiment No. | Titre | Mean |
|---|---|---|
| 33 | 390 | 390 |
| 34 | 270, 255 | 260 |

With 0.08% thiosulphate:

| Experiment No. | Titre | Mean |
|---|---|---|
| 35 | 520, 450 | 485 |
| 36 | 425, 445 | 435 |

*Phenylethylamine—6 days culture*

[Level 0.15%.]

| Experiment No. | Titre | Mean |
|---|---|---|
| 37 | 395 | 395 |
| 38 | 375 | 375 |

With 0.08% thiosulphate:

| Experiment No. | Titre | Mean |
|---|---|---|
| 39 | 550, 485 | 520 |
| 40 | 425, 535 | 475 |

[Level 0.3%.]

| Experiment No. | Titre | Mean |
|---|---|---|
| 41 | 470 | 470 |
| 42 | 455 | 455 |

With 0.08% thiosulphate:

| Experiment No. | Titre | Mean |
|---|---|---|
| 43 | 560, 550 | 555 |
| 44 | 575, 640 | 605 |

[Level 0.6%.]

| Experiment No. | Titre | Mean |
|---|---|---|
| 45 | 430, 470 | 450 |
| 46 | 460, 410 | 435 |

With 0.08% thiosulphate:

| Experiment No. | Titre | Mean |
|---|---|---|
| 47 | 555, 545 | 550 |
| 48 | 610, 520 | 565 |

*Phenylethylamine—7 days culture*

[Level 0.15%.]

| Experiment No. | Titre | Mean |
|---|---|---|
| 49 | 225, 330 | 280 |
| 50 | 460 | 460 |

With thiosulphate (0.08%):

| Experiment No. | Titre | Mean |
|---|---|---|
| 51 | 490, 510 | 500 |
| 52 | 610 | 610 |

[Level 0.3%.]

| Experiment No. | Titre | Mean |
|---|---|---|
| 53 | 540 | 540 |
| 54 | 475 | 475 |

With thiosulphate (0.08%):

| Experiment No. | Titre | Mean |
|---|---|---|
| 55 | 575 / 565 | 570 |
| 56 | 585 / 510 | 545 |

[Level 0.6%.]

| Experiment No. | Titre | Mean |
|---|---|---|
| 57 | 660 | 660 |
| 58 | 455 / 440 | 450 |

With thiosulphate (0.08%):

| Experiment No. | Titre | Mean |
|---|---|---|
| 59 | 575 / 560 | 570 |
| 60 | 650 / 615 | 635 |

Fermentations carried out in 5-litre fermenters

The following microbiological titres were obtained from five-litre fermenters on the same basal medium as that used for the shake flasks. Phenylacetamide was added at 0.15 and 0.3%.

| Log Hours | Without Sodium Thiosulphate | | With Sodium Thiosulphate 0.08+ | |
|---|---|---|---|---|
| | 0.15% phenylacetamide | 0.3% phenylacetamide | 0.15% phenylacetamide | 0.3% phenylacetamide |
| 70 | 840 | 770 | 780 | 630 |
| 82 | 580 | 660 | 620 | 590 |
| 94 | 790 | 760 | 870 | 1,030 |
| 106 | 990 | 880 | 1,030 | 1,150 |
| 118 | 920 | 740 | 1,150 | 1,010 |
| 130 | 930 | 720 | 1,430 | 1,070 |
| 142 | 780 | 810 | 980 | 1,090 |

EXAMPLE 2

The following medium was employed for experiments with phenylacetylethanolamine

| | Percent |
|---|---|
| Lactose | 3 |
| Cornsteep solids | 3 |
| Chalk | 1 |
| $KH_2PO_4$ | 0.4 |
| Phenylacetylethanolamine | 0.1 |
| Maize oil (by volume) | 0.25 | a number of shake-flask experiments were conducted using *Penicillium chrysogenum* var. *brevisterigma* (see United States Patent No. 2,458,495) half of the flasks were given as a supplement 0.02% extra sulphur in the form of sodium thiosulphate 0.08%. The results were as follows:

| Incubation time | Control, I.U./ml. | +Thiosulphate, I.U./ml. |
|---|---|---|
| 5 days | 1,340 / 1,380 | 1,370 / 1,490 |
| 6 days | 1,380 / 1,320 | 1,590 / 1,610 |
| 7 days | 1,175 / 1,165 | 1,235 / 1,310 |

These results, showing approximately 200 I. U./ml. increase in titre at 5 and 6 days for the thiosulphate flasks, were statistically significant.

Since it was not known whether the effect was due to a peculiarity of the particular batch of cornsteep used, fourteen other batches were tested in shake-flasks with and without the addition of sodium thiosulphate and in every case it was found that an increase in titre was obtained by the addition.

Sodium thiosulphate was next tested in 5-litre fermenters. For these experiments a medium containing a higher concentration of both lactose and cornsteep solids was used:

| | Percent |
|---|---|
| Lactose | 3.5 |
| Cornsteep solids | 3.5 |
| Chalk | 1.0 |
| $KH_2PO_4$ | 0.4 |
| Phenylacetylethanolamine | 0.1 |
| Maize oil | 0.25 |

To this medium was added 0.08% of sodium thiosulphate, equivalent to 0.02% of sulphur as in the shake-flask experiments.

After 96 and 108 hours fermentation the following titres were attained:

| Bottle | 96 hours, I. U. /ml. | 108 hours, I. U. /ml. |
|---|---|---|
| 17 | 1,430 | 1,620 |
| 18 | 2,020 | 1,650 |
| 20 | 1,430 | 1,580 |
| 21 | 1,550 | 1,460 |
| 23 | 1,320 | 1,400 |
| 24 | 2,070 | 1,860 |

Control tests carried out in exactly the same manner but without the sodium thiosulphate give the following results:

| Bottle | 92 hrs. | 116 hrs. |
|---|---|---|
| 25 | 1,200 | 750 |
| 26 | 1,140 | 850 |
| 27 | 1,090 | 930 |
| 28 | 840 | 1,270 |
| 29 | 910 | 1,190 |

Further experiments in 5-litre fermenters were done in a medium of the following composition:

| | Percent |
|---|---|
| Lactose | 3.5 |
| Corn steep liquor solids (by weight) | 3.5 |
| Phenylacetylethanolamine | 0.2 |
| $KH_2PO_4$ | 0.4 |
| Sodium thiosulphate | 0.08 |
| Chalk | 1.0 |
| Maize oil | 0.25 |

In these experiments the precursor was increased from 0.1% to 0.2% in order to sustain the increased penicillin-producing potential of the sodium thiosulphate addition. The following titres are indicative of the yields achieved.

| Bottle | 96 hours, I. U./ml. | 108 hours, I. U./ml. |
|---|---|---|
| 6 | 2,040 | 1,980 |
| 20 | 1,770 | 2,020 |

The same medium was then found to be equally beneficial for other strains of *P. chrysogenum*. Using two different strains the following titres were obtained:

| Bottle No. | 96 hours | 108 hours |
|---|---|---|
| Strain 1: | | |
| 13 | 1,650 | 1,870 |
| 17 | 1,560 | 2,250 |
| Strain 2: | | |
| 14 | 2,160 | 2,130 |
| 18 | 2,050 | 1,970 |
| 15 | 2,020 | 2,230 |
| 21 | 2,090 | 2,350 |

Experimental data were next obtained using different levels of corn steep liquor and lactose. The following titres were obtained:

| Treatment | | Bottle No. | 96 hours | 108 hours |
|---|---|---|---|---|
| 1 | 3.5% CSL | 24 | 1,800 | 2,220 |
| | 3.5% Lactose | 4 | 1,940 | 2,100 |
| | | 17 | 2,220 | 1,810 |
| 2 | 4.0% CSL | 16 | 1,900 (84 hrs.) | |
| | 3.5% Lactose | 13 | 1,990 | 1,700 |
| 3 | 5.0% CSL | 6 | 1,650 (84 hrs.) | |
| | 3.5% Lactose | 20 | 1,780 | 710 |
| 4 | 4.0% CSL | 5 | 2,330 | 2,100 |
| | 4.0% Lactose | 15 | 2,090 | 1,580 |
| 5 | 4.5% CSL | 19 | 1,660 | |
| | 4.0% Lactose | 14 | 2,070 | 1,780 |
| 6 | 5.0% CSL | 21 | 1,580 | 650 |
| | 4.0% Lactose | 23 | 1,380 | 1,320 |

Thus it is clear that any one of a number of constituents of the initial medium may become limiting. To overcome this difficulty and permit titres of a much higher order, it is necessary to ensure that no factor in the medium is present in limiting amounts. Such conditions are fulfilled without introducing any other deleterious effects when a fermentation medium or the following composition is used:

| | Percent |
|---|---|
| Lactose | 3.5 |
| Corn steep liquor solids (by weight) | 3.5 |
| Phenylacetylethanolamine | 0.2 |
| $KH_2PO_4$ | 0.4 |
| Sodium thiosulphate | 0.08 |
| Chalk | 1.0 |

EXAMPLE 3

A number of experiments were carried out using phenylacetic acid as precursor. The conditions and results were as follows:

Medium:
- Lactose _____ 3.5%.
- C. S. L. solids _____ 3.5%.
- $KH_2PO_4$ _____ 0.4%.
- Chalk _____ 1.0%.
- Maize oil _____ 0.16 ml. per flask added separately.

Sterilized 20 minutes at 15 lbs. per square inch pressure.

Strain: *P. chrysogenum*, P. M. 3.

Precursor: Three levels of neutralized phenylacetic acid added aseptically at 24 hrs.

RESULTS

| | 0.12% Phenylacetic Acid | | 0.24% Phenylacetic Acid | | 0.48% Phenylacetic Acid | |
|---|---|---|---|---|---|---|
| | With 0.08% Thiosulphate | No Thiosulphate | With 0.08% Thiosulphate | No Thiosulphate | With 0.08% Thiosulphate | No Thiosulphate |
| 5 days: | | | | | | |
| Flask 1 | 265 | 180 | 335 | 10 | <20 | <20 |
| Flask 2 | 290 | 205 | 335 | 8 | <20 | <20 |
| Flask 3 | 345 | 195 | 313 | 7 | <20 | <20 |
| Mean | 300 | 193 | 327 | 8 | <20 | <20 |
| 6 days: | | | | | | |
| Flask 1 | 300 | 235 | 415 | 85 | 20 | 100 |
| Flask 2 | 345 | 220 | 445 | 90 | 25 | 10 |
| Flask 3 | 360 | 255 | 350 | 50 | 130 | 10 |
| Mean | 335 | 236 | 403 | 75 | 58 | 40 |
| 7 days: | | | | | | |
| Flask 1 | 350 | 251 | 420 | 50 | 14 | 7 |
| Flask 2 | 440 | 255 | 430 | 190 | 18 | 6 |
| Flask 3 | | 251 | 375 | 295 | 14 | |
| Mean | 395 | 251 | 408 | 178 | 15 | 6 |

It will be noted that at the 0.24% level of precursor, its toxic effect is removed on the addition of the thiosulphate.

We claim:
1. A process for the production of penicillin which comprises fermenting a penicillin-producing mould under deep culture conditions in a corn steep liquor-containing medium containing both a penicillin precursor and an at least partially water-soluble thiosulphate, the amounts of said precursor and said thiosulphate in said medium being sufficient to produce an increased yield of penicillin but insufficient to cause substantial inhibition of the fermentation.

2. The process defined in claim 1 in which said medium contains at least 0.1% by weight of said precursor and at least 0.01% by weight of sulphur in the form of said thiosulphate.

3. The process defined in claim 1 in which said medium contains at least 0.2% by weight of said precursor and at least 0.02% by weight of sulphur in the form of said thiosulphate.

4. The process defined in claim 3 in which said thiosulphate is sodium thiosulphate.

5. The process defined in claim 3 in which said thiosulphate is potassium thiosulphate.

6. The process defined in claim 3 in which said thiosulphate is ammonium thiosulphate.

7. The process defined in claim 3 in which said thiosulphate is magnesium thiosulphate.

8. The process defined in claim 3 in which said penicillin precursor is phenylacetic acid.

9. The process defined in claim 3 in which said penicillin precursor is phenylacetamide.

10. The process defined in claim 3 in which said penicillin precursor is phenylacetylethanolamine.

11. The process defined in claim 3 in which said penicillin precursor is β-phenylethylamine.

References Cited in the file of this patent
UNITED STATES PATENTS

| 2,437,918 | McCormack | Mar. 16, 1948 |
|---|---|---|
| 2,440,358 | Behrens | Apr. 27, 1948 |

OTHER REFERENCES

Baron: Handbook of Antibiotics, 1950, Reinhold, pages 184 to 185.